United States Patent [19]
Lind et al.

[11] 3,992,420
[45] Nov. 16, 1976

[54] 3,5-DIALKYL-4-HYDROXYBENZYL-OXIRANES

[75] Inventors: Hanns Lind, Liestal; Rolf Hugi, Basel; Heimo Brunetti, Reinach, all of Switzerland

[73] Assignee: CIBA-GEIGY Corporation, Ardsley, N.Y.

[22] Filed: May 7, 1975

[21] Appl. No.: 575,314

Related U.S. Application Data

[63] Continuation of Ser. No. 368,401, June 8, 1973, abandoned.

[30] Foreign Application Priority Data
June 12, 1972 Switzerland.......................... 8700/72

[52] U.S. Cl. .......................... 260/348 R; 260/327 E; 252/404; 260/45.8 A
[51] Int. Cl.² ....................... C07D 303/14
[58] Field of Search ................................. 260/348 R

[56] References Cited
UNITED STATES PATENTS
3,526,668  9/1970  Starnes et al.................... 260/624 B
3,717,611  2/1973  Baumer et al................... 260/348 R

*Primary Examiner*—Norma S. Milestone
*Attorney, Agent, or Firm*—Charles W. Vanecek

[57] ABSTRACT

New 3,5-dialkyl-4-hydroxybenzyl-oxiranes and the corresponding thiiranes are used as stabilizers for polymers. The oxiranes are prepared from the corresponding olefins by reaction with percarboxylic acids or from alkali phenoxides and epichlorohydrines. The thiiranes are prepared from the oxiranes by the usual sulfidation methods.

7 Claims, No Drawings

3,5-DIALKYL-4-HYDROXYBENZYL-OXIRANES

This is a continuation of application Ser. No. 368,401 filed on June 8, 1973 and now abandoned.

The present invention relates to new compounds, methods for their manufacture, a process for their use for stabilizing organic material against thermo-oxidative degradation, and the organic material stabilised with the aid of these compounds.

The new compounds correspond to the general formula I

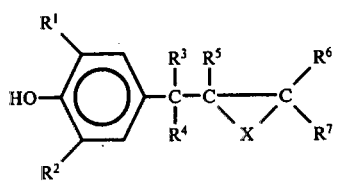

in which $R^1$ denotes alkyl with 1 to 8 carbon atoms, cycloalkyl with 6 to 8 carbon atoms or aralkyl with 7 to 9 carbon atoms, $R^2$ denotes hydrogen, alkyl with 1 to 5 carbon atoms, cycloalkyl with 6 to 8 carbon atoms or aralkyl with 7 to 9 carbon atoms, $R^3$, $R^4$, $R^5$ and $R^6$ independently of one another denote hydrogen, methyl or a

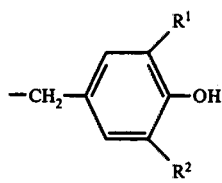

radical $R^7$ denotes hydrogen, alkyl with 1 to 17 carbon atoms, halogenomethyl, phenyl or a

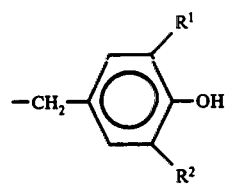

radical and X denotes O or S.

Numerous derivatives of sterically hindered phenols have already been proposed as stabilizers against the thermo-oxidative degradation of polymers. All these compounds show the feature that whilst they extend the working life of the polymers they frequently lead, especially under the action of sunlight or industrial waste gases, to undesired discolourations of the inherently colorless polymers. Surprisingly, it has been found that the compounds of the formula I are not only good stabilizers against thermo-oxidative degradation but also show practically no objectionable discoloration under the action of light and/or industrial waste gases (under "gas fading" conditions).

Furthermore, the compounds of the formula I are intermediate products for the synthesis of further stabilizers against the thermo-oxidative degradation of organic materials.

In the definition of the compounds of the formula I, $R^1$ and $R^2$ can be alkyl with 1–8 carbon atoms and $R^7$ can be alkyl with 1–17 carbon atoms such as, for example, methyl, ethyl, iso-propyl, butyl, sec.-butyl, tert.-butyl, amyl, tert.-amyl, sec.-amyl, hexyl, octyl, tert.-octyl, decyl, dodecyl, tetradecyl or heptadecyl.

$R^1$ and $R^2$ can also be a cycloalkyl group with 6–8 carbon atoms such as, for example, cyclohexyl, α-methylcyclohexyl or cyclooctyl or an aralkyl group with 7 to 9 carbon atoms, such as benzyl, α-phenylethyl or α,α-dimethylbenzyl.

If $R^7$ denotes halogenomethyl it can be, for example, —CH$_2$Cl or —CH$_2$Br.

Preferred compounds of the formula I are those in which $R^1$ and $R^2$ independently of one another denote alkyl with 1 to 4 carbon atoms, cycloalkyl or α-methylbenzyl, $R^3$, $R^4$ and $R^6$ denote hydrogen, $R^5$ denotes hydrogen, methyl or a radical

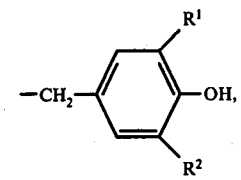

$R^7$ denotes hydrogen, alkyl with 1 to 15 carbon atoms, —CH$_2$Cl, —CH$_2$Br or a

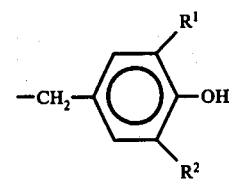

radical and X denotes O or S.

Particularly preferred compounds of the formula I are those in which $R^1$ and $R^2$ denote tert.-butyl, $R^3$, $R^4$ and $R^6$ denote hydrogen, $R^5$ denotes hydrogen or methyl, $R^7$ denotes hydrogen, alkyl with 1 to 15 carbon atoms or the

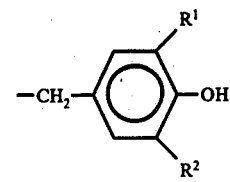

radical and X denotes O and S.

The manufacture of the compounds of the formula I wherein X denotes oxygen can be effected, for example, by reaction of a compound of the general formula II

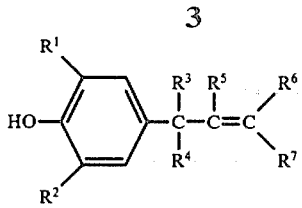

(II)

wherein $R^1$, $R^2$, $R^3$, $R^4$, $R^5$, $R^6$ and $R^7$ have the abovementioned meaning, with peracids, preferably at $-10°$ to $100°$ C, in a solvent. Examples of peracids which can be used are perbenzoic acid, perchlorobenzoic acid, peracetic acid, perphthalic acid, perpropionic acid, pertrifluoroacetic acid, performic acid, perpelargonic acid or persuccinic acid.

Possible solvents are, for example, chloroform, tetrachloromethane, methylene chloride, ethylene chloride and ethyl acetate. The reaction of the compound of the formula II with the peracid is carried out using approximately the molar ratio; preferably, a 10% excess of peracid is used in the reaction.

Compounds of the formula I wherein $R^1$ and $R^2$ independently of one another each denote an $\alpha,\alpha$-branched alkyl group with 4 to 8 carbon atoms, preferably each a tertiary butyl group, $R^3$, $R^4$, $R^5$ and $R^6$ independently of one another denote hydrogen, methyl or a

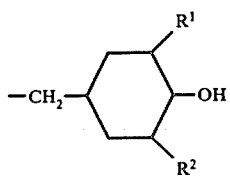

radical, $R^7$ denotes hydrogen, with 1 to 17 carbon atoms, phenyl or a

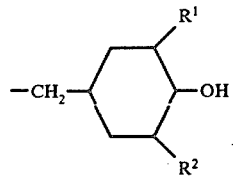

radical and X denotes oxygen can also be manufactured by reacting a compound of the formula III

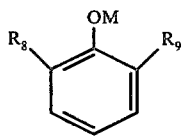

(III)

with a compound of the formula IV

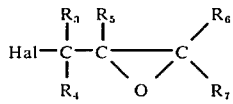

(IV)

wherein M denotes an alkali metal atom and Hal denotes a halogen atom.

The reaction is carried out in solvents, preferably in dimethylformamide, dimethylacetamide, N-methylpyrrolidone, toluene or xylene, or in a melt of the phenol which is being reacted, at temperatures of 25°–300° C; the molar ratio of the phenolate which is being reacted, of the formula III, to the compound of the formula IV is 1:1–20, but preferably 1:1.1.

Compounds of the formula I in which X denotes sulphur are manufactured by reaction of the compounds of the formula I in which X denotes oxygen with thiourea or an alkali metal thiocyanate, such as, for example, potassium thiocyanate, in a solvent. The reaction is preferably carried out at room temperature. Methanol, for example, is used as the solvent. The thiourea or alkali metal thiocyanate and the compound of the formula I are employed in approximately molar ratio. Preferably, a 10% excess of thiourea or alkali metal thiocyanate is used in the reaction.

Examples of stabilizers of the formula I are: 3,5-dicyclooctyl-4-hydroxybenzyl-oxirane, 3,5-di-tert.-pentyl-4-hydroxybenzyl-oxirane, 3,5-di-tert.-butyl-4-hydroxybenzyloxirane, 3,5-di-iso-propyl-4-hydroxybenzyl-oxirane, 3,5-dimethyl-4-hydroxybenzyl-oxirane, 3-methyl-5-tert.-butyl-4-hydroxybenzyl-oxirane, bis-2,3-(di-tert.-butyl-4-hydroxybenzyl)-oxirane, 2-(3,5-di-tert.-butyl-4-hydroxybenzyl)-2-methyl-oxirane, 2-(3,5-di-tert.-butyl-4-hydroxybenzyl)-3-methyl-oxirane, 2-(3,5-di-tert.-butyl-4-hydroxybenzyl)-3-chloromethyl-oxirane, 2-(3-methyl-5-tert.-butyl-4-hydroxybenzyl)-3-phenyl-oxirane, 2-(3-methyl-5-tert.-butyl-4-hydroxybenzyl)-3-pentadecyl-oxirane, 3,5-di-cyclooctyl-4-hydroxybenzyl-thiirane, 3,5-di-tert.-pentyl-4-hydroxybenzyl-thiirane, 3,5-di-tert.-butyl-4-hydroxybenzyl-thiirane, 3,5-di-iso-propyl-4-hydroxybenzyl-thiirane, 3,5-di-methyl-4-hydroxybenzyl-thiirane, 3-methyl-5-tert.-butyl-4-hydroxybenzyl-thiirane, bis-2,3-(di-tert.-butyl-4-hydroxybenzyl)-thiirane, 2-(3,5-di-tert.-butyl-4-hydroxybenzyl)-2-methyl-thiirane and 2-(3,5-di-tert.-butyl-4-hydroxybenzyl)-3-methyl-thiirane.

The compounds of the formula I are used as stabilizers for organic substrates. As such it is possible to use, for example:

1. Polymers which are derived from hydrocarbons with single or double unsaturation, such as polyolefines, such as, for example, polyethylene, which can optionally be crosslinked, polypropylene, polyisobutylene, polymethylbutene-1, polymethylpentene-1, polybutene-1, polyisoprene, polybutadiene, polystyrene, polyisobutylene, copolymers of the monomers on which the homopolymers mentioned are based, such as ethylene-propylene copolymers, propylene-butene-1 copolymers, propylene-isobutylene copolymers, styrene-butadiene copolymers and terpolymers of ethylene and propylene with a diene, such as, for example, hexadiene, dicyclopentadiene or ethylidenenorbornene; mixtures of the abovementioned homopolymers, such as, for example, mixtures of polypropylene and polyethylene, polypropylene and polybutene-1, or polypropylene and polyisobutylene.

2. Vinyl polymers containing halogen, such as polyvinyl chloride, polyvinylidene chloride, polyvinyl fluoride, but also polychloroprene and chlorinated rubbers.

3. Polymers which are derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymers.

4. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyral, polyallyl phthalate, polyallyl melamine and their copolymers with other vinyl compounds, such as ethylene/vinyl acetate copolymers.

5. Homopolymers and copolymers which are derived from epoxides, such as polyethylene oxide or the polymers which are derived from bis-glycidyl ethers.

6. Polyacetals, such as polyoxymethylene and polyoxyethylene, as well as those polyoxymethylenes which contain ethylene oxide as the comonomer.

7. Polyphenylene oxides.

8. Polyurethanes and polyureas.

9. Polycarbonates.

10. Polysulphones.

11. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

12. Polyesters which are derived from dicarboxylic acids and dialcohols and/or from hydroxycarboxylic acids or the corresponding lactones, such as polyethylene glycol terephthalate or poly-1,4-dimethylolcyclohexane terephthalate.

13. Crosslinked polymers which are derived from aldehydes on the one hand and phenols, ureas and melamines on the other, such as phenol-formaldehyde, urea-formaldehyde and melamine-formaldehyde resins.

14. Alkyd resins such as glycerine-phthalic acid resins and their mixtures with malamine-formaldehyde resins.

15. Unsaturated polyester resins which are derived from copolyesters of saturated and unsaturated dicarboxylic acids with polyhydric alcohols, with vinyl compounds as crosslinking agents, and also their halogen-containing modifications of low inflammability.

16. Natural polymers such as cellulose, rubber, proteins and their polymer-homologously chemically modified derivatives, such as cellulose acetates, cellulose propionates and cellulose butyrates, or the cellulose ethers, such as methylcellulose.

17. High molecular monomeric substances, for example mineral oils, animal and vegetable fats, oils and waxes, or oils, waxes and fats based on synthetic esters.

The compounds of the formula I are incorporated into the substrates in a concentration of 0.01 to 5% by weight calculated relative to the material to be stabilised.

Preferably, 0.05 to 2.0, and particularly preferentially 0.1 to 1.0, % by weight of the compounds, calculated relative to the material to be stabilized, are incorporated into the latter. The incorporation can take place, for example, by mixing in at least one of the compounds of the formula I and optionally further additives in accordance with the methods customary in the art, before or during shaping, or by applying the dissolved or dispersed compounds to the polymer, if appropriate with subsequent evaporation of the solvent.

In the case of crosslinked polyethylene, the compounds are added before crosslinking.

The compounds of the formula I can also be added before or during polymerization, and where incorporation into the polymer chain is possible, stabilized substrates are obtained in which the stabilizers are not volatile or extractable.

As further additives together with which the stabilisers can be employed, there should be mentioned:

1. Antioxidants of the aminoaryl and hydroxyaryl series. Amongst the latter, the sterically hindered phenol compounds of the following classes should be mentioned:

a. simple 2,6-dialkylphenols such as, for example, 2,6-di-tert.-butyl-4-methylphenol, 2-tert.-butyl-4,6-dimethylphenol, 2,6-di-tert.-butyl-4-methoxymethylphenol and 2,6-dioctadecyl-4-methylphenol.

b. derivatives of alkylated hydroquinones such as, for example, 2,5-di-tert.-butyl-hydroquinone, 2,5-di-tert.-amyl-hydroquinone, 2,6-di-tert.-butyl-hydroquinone, 2,5-di-tert.-butyl-4-hydroxy-anisole, 3,5-di-tert.-butyl-4-hydroxy-anisole and tris(3,5-di-tert.-butyl-4-hydroxyphenyl)-phosphite.

c. hydroxylated thiodiphenyl ethers such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol) and 4,4'-thio-bis-(6-tert.-butyl-2-methylphenol).

d. alkylidene - bisphenols such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di-(3-tert.-butyl-5-methyl-2-hydroxybenzyl)-4-methylphenol, 2,2'-methylene-bis-[4-methyl-6-(methylcyclohexyl)-phenol], 1,1-bis-(3,5-dimethyl-2-hydroxyphenylbutane), 1,1-bis-(5-tert.-butyl-4-hydroxy-2-methylphenyl)-butane, 2,2-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2,-bis-(5-tert.-butyl-4-hydroxy-2-methylphenyl)-4-n-dodecylmercapto-butane, 1,1,5,5-tetra-(5-tert.-butyl-4-hydroxy-2-methylphenyl)-pentane, and ethylene glycol bis-[3,3-bis-(3'-tert.-butyl-4'-hydroxyphenyl)-butyrate].

e. O-, N- and S-benzyl compounds such as, for example, 3,5,3',5'-tetra-tert.-butyl-4,4'-dihydroxydibenzyl ether, 4-hydroxy-3,5-dimethylbenzyl-mercaptoacetic acid octadecyl ester, tri-(3,5-di-tert.-butyl-4-hydroxybenzyl)-amine and bis-(4-tert.-butyl-3-hydroxy-2,6-dimethylbenzyl)-dithiol terephthalate.

f. hydroxybenzylated malonic esters such as, for example, 2,2-bis-(3,5-di-tert.-butyl-4-hydroxybenzyl)-malonic acid dioctadecyl ester, 2-(3-tert.-butyl-4-hydroxy-5-methylbenzyl)-malonic acid dioctadecyl ester, 2,2-bis-(3,5-tert.-butyl-4-hydroxybenzyl)-malonic acid didodecylmercapto-ethyl ester and 2,2-bis-(3,5-di-tert.-butyl-4-hydroxybenzyl)-malonic acid di-(4-di-t.-octylphenyl) ester.

g. hydroxybenzyl - aromatics such as, for example, 1,3,5-tri-(3,5-di-tert.-butyl-4-hydroxybenzyl)-2,4,6-trimethylbenzene, 1,4-di-(3,5-di-tert.-butyl-4-hydroxybenzyl)-2,3,5,6-tetramethylbenzene and 2,4,6-tri-(3,5-di-tert.-butyl-4-hydroxybenzyl)-phenol.

h. s-triazine compounds such as, for example, 2,4-bis-octylmercapto-6-(3,5-di-tert.-butyl-4-hydroxyanilino)-s-triazine, 2-octylmercapto-4,6-bis-(3,5-di-tert.-butyl-4-hydroxyanilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl)-isocyanurate.

i. amides of 3,5-di-tert.-butyl-4-hydroxphenyl-propionic acid such as, for example, 1,3,3-tri-(3,5-di-tert.-butyl-4-hydroxyphenyl-propionyl)hexahydro-s-triazine and N,N'-di-(3,5-di-tert.-butyl-4-hydroxyphenyl-propionyl)-hexamethylenediamine.

k. esters of 3,5-di-tert.-butyl-4-hydroxyphenyl-propionic acid with monohydric or polyhydric alcohols such as, for example, methanol, ethanol, octadecanol, 1,6-hexanediol, 1,9-nonanediol, ethylene glycol, 1,2-propanediol, 3-thia-undecanol, 3-thiapentadecanol, trimethylhexanediol, trimethylolethane, trimethylolpropane, tris-hydroxyethyl-isocyanurate, 4-hydroxymethyl-1-phospha-2,6,7-trioxabicyclo[2,2,2]octane, diethylene glycol, thiodiethylene glycol, neopentyl glycol and pentaerythritol.

l. esters of 5-tert.-butyl-4-hydroxy-3-methylphenyl-propionic acid with monohydric or polyhydric alcohols such as, for example, methanol, ethanol, octadecanol, 1,6-hexanediol, 1,9-nonanediol, ethylene glycol, 1,2-propanediol, diethylene glycol, thiodiethylene glycol, neopentyl glycol, 3-thiaundecanol, 3-thia-pentadecanol, trimethylhexanediol, trimethylolethane, trimethylolpropane, tris-hydroxyethyl-isocyanurate, 4-hydroxymethyl-1-phospha-2,6,7-trioxabicyclo[2,2,2] octane and pentaerythritol.

m. esters of 3,5-di-tert.-butyl-4-hydroxyphenylacetic acid with monohydric or polyhydric alcohols such as, for example, methanol, ethanol, octadecanol, 1,6-hexanediol, 1,9-nonanediol, ethylene glycol, 3-thia-undecanol, 3-thia-pentadecanol, trimethylhexanediol, trimethylolethane, trimethylolpropane, trishydroxyethyl-isocyanurate, 1,2-propanediol, diethylene glycol, thiodiethylene glycol, meopentyl glycol and pentaerythritol.

n. acylaminophenols such as, for example, N-(3,5-di-tert.-butyl-4-hydroxyphenyl)-stearic acid amide and N,N'-di-(3,5-di-tert.-butyl-4-hydroxyphenyl)-thio-bis-acetamide.

o. benzylphosphonates such as, for example, 3,5-di-tert.-butyl-4-hydroxybenzyl-phosphonic acid dimethyl ester, 3,5-di-tert.-butyl-4-hydroxybenzyl-phosphonic acid diethyl ester, 3,5-di-tert.-butyl-4-hydroxybenzyl-phosphonic acid dioctadecyl ester and 5-tert.-butyl-4-hydroxy-3-methylbenzyl-phosphonic acid dioctadecyl ester.

p. Amongst the aminoaryl derivatives there should be mentioned aniline and naphthylamine derivatives as well as their heterocyclic derivatives, for example: phenyl-1-naphthylamine, phenyl-2-naphthylamine, N,N'-diphenyl-p-phenylenediamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, mono- and dioctyliminodibenzyl and polymerised 2,2,4-trimethyl-1,2-dihydroquinoline.

2. UV absorbers and light protection agents such as:

a. 2-(2'-hydroxyphenyl)-benztriazoles, for example the 5'-methyl, 3',5'-di-tert.butyl, 5'-tert.butyl-, 5-chloro-3',5'-di-tert.butyl-, 5-chloro-3'-tert.butyl-5'-methyl-, 3'sec.-butyl-5'-tert.butyl-, 3'-[α-methyl-benzyl]-5'-methyl-, 3'[αmethylbenzyl]-5'-methyl-5-chloro-, 4'-octoxy-, 3',5'-di-tert.amyl-, 3'-methyl-5'-carbomethoxyethyl- and 5-chloro-3',5'-di-tert.amyl- derivative.

b. 2,4-Bis-(2'-hydroxyphenyl)-6-alkyl-s-triazines, for example the 6-ethyl- or 6-undecyl-derivative.

c. 2-Hydroxy-benzophenones, for example the 4-hydroxy-, 4-methoxy-, 4-octoxy-, 4-decyloxy-, 4-dodecyloxy-, 4,2',4'-trihydroxy- or 2'-hydroxy-4,4'-dimethoxy-derivative.

d. 1,3-Bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene, and 1,3-bis-(2'-hydroxy-4'-dodecyloxy-benzoyl)-benzene.

e. Aryl esters of optionally substituted benzoic acids such as, for example, phenyl salicylate, octylphenyl salicylate, di-benzoylresorcinol, bis-(4-tert.butyl-benzoyl)-resorcinol, benzoylresorcinol and 3,5-di-tert.butyl-4-hydroxybenzoic acid 2,4-di-tert.butyl-phenyl ester, its octadecyl ester or its 2-methyl-4,6-di-tert.butyl-phenyl ester.

f. Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester and N-(β-carbomethoxy-vinyl)-2-methyl-indoline.

g. Nickel compounds, for example nickel complexes of 2,2'-thiobis-(4-tert.octylphenol), such as the 1:1 and 1:2 complex, optionally with other ligands such as n-butylamine, nickel complexes of bis-(4-tert.octylphenyl)-sulphone, such as the 2:1 complex, optionally with other ligands such as 2-ethylcaproic acid, nickel dibutyldithiocarbamate, nickel salts of 4-hydroxy-3,5-di-tert.butylbenzyl-phosphonic acid monoalkyl esters such as the methyl, ethyl or butyl ester, the nickel complex of 2-hydroxy-4-methyl-phenyl-undecylketoxime and nickel 3,5-di-tert.butyl-4-hydroxy-benzoate.

h. Oxalic acid diamides, for example 4,4'-di-octyloxy oxanilide, 2,2'-di-octyloxy-5,5'-di-tert.butyl-oxanilide and 2,2'-di-dodecyloxy-5,5'-di-tert.butyl-oxanilide.

i. Sterically hindered amines, for example 4-benzoyloxy-2,2,6,6-tetramethylpiperidine, 4-stearoyloxy-2,2,6,6-tetramethylpiperidine, bis-(2,2,6,6-tetramethylpiperidyl)-sebacate and 3-n-octyl-7,7,9,9-tetramethyl-1,3-triaza-spiro-[4,5]-decane-2,4-dione.

3. Metal des activators, such as oxanilide, isophtalic acid dihydrazide, sebacic acid bis-phenylhydrazide, bis-benzylideneoxalic acid dihydrazide, N,N'-diacetyl-adipic acid dihydrazide, N,N'-bis-salicyloyl-oxalic acid dihydrazide and N,N'-bis-salicyloyl-hydrazine.

4. Phosphites, such as triphenylphosphite, diphenylalkylphosphites, phenyldialkylphosphites, trinonylphenylphosphite, trilaurylphosphite, trioctadecylphosphite, 3,9-di-isodecyloxy-2,4,8,10-tetraoxa-3,9-diphosphaspiro-(5,5)-undecane and tri-(4-hydroxy-3,5-di-tert.butylphenyl)-phosphite.

5. Compounds which destroy peroxides, such as esters of β-thiodipropionic acid, for example the lauryl, stearyl, myristyl or tridecyl esters, salts of 2-mercaptobenzimidazole, for example the zinc salt, and diphenylthiourea 6. Polyamide stabilizers, such as copper salts in combination with iodides and/or further phosphorus compounds and salts of divalent manganese.

7. Basic co-stabilizers, such as polyvinyl pyrrolidone, melamine, benzoguanamine, trillyl cyanurate, dicyandiamide, urea derivatives, hydrazine derivatives, amines, polyamides, polyurethanes, and alkali metal salts and alkaline earth metal salts of higher saturated or unsaturated fatty acids such as, for example, Ca stearate.

8. PVC stabilizers such as organic tin compounds, organic lead compounds and Ba/Cd salts of fatty acids.

9. Nucleating agents, such as 4-tert.butylbenzoic acid, adipic acid and diphenylacetic acid.

10. Other additives such as plasticizers, lubricants, for example glycerine monostearate, emulsifiers, antistatic agents, flameproofing agents, pigments, carbon black, asbestos, glass fibres, kaolin and talc.

The invention is explained in more detail in the examples which follow. Per cent (%) denotes percent by weight and parts denote parts by weight, in the examples.

EXAMPLE 1

Manufacture of 3,5-di-tert.-butyl-4-hydroxybenzyloxirane.

A solution of 22.4 g [0.11 mol] of m-chloroperbenzoic acid [85% strength] in 300 ml of dry methylene chloride is added dropwise to a solution of 24.6 g [0.10 mol] of 4-allyl-2,6-di-tert.-butylphenol of boiling point$_6$: 134°–36° C [manufactured according to the data in Journ. Org. Chem. USSR 1967, 95] in 175 ml of dry methylene chloride at room temperature, at a speed such that the temperature of the reaction solution does not exceed room temperature. Stirring is continued at room temperature until a sample of the reaction solution indicates that 1 equivalent of peracid has been consumed. Thereafter, excess peracid is destroyed by adding 10% strength aqueous sodium sulphate solution and the organic phase is successively extracted with 5% strength sodium bicarbonate solution and with water, dried over sodium sulphate and evaporated. Crude 3,5-di-tert.-butyl-4-hydroxybenzyloxirane is obtained as a brownish oil which, when recrystallized from petroleum ether, yields colorless crystals of melting point 86°–87° C.

EXAMPLES 2–11

The procedure under Example 1 is followed but instead of 4-allyl-2,6-di-tert.-butylphenol the compounds listed in Table 2 are used, in equivalent amounts, as starting substances. This gives the oxiranes 2 to 11 listed in Table 1.

Table 1

| Example No. | Formula | M.p./B.p. (° C) |
|---|---|---|
| 2. | t-C$_4$H$_9$–C$_6$H$_2$(OH)(t-C$_4$H$_9$)–CH$_2$–C(CH$_3$)(–CH$_2$)–O (oxirane) | M.p. 74–75° |
| 3. | t-C$_4$H$_9$–C$_6$H$_2$(OH)(t-C$_4$H$_9$)–CH$_2$–CH–CH–CH$_3$, O (oxirane) | M.p. 60–61° |
| 4. | t-C$_4$H$_9$–C$_6$H$_2$(OH)(t-C$_4$H$_9$)–CH$_2$–CH–CH–(CH$_2$)$_4$CH$_3$, O (oxirane) | M.p. 40–41.5° |
| 5. | t-C$_4$H$_9$–C$_6$H$_2$(OH)(t-C$_4$H$_9$)–CH$_2$–CH–CH–(CH$_2$)$_{14}$CH$_3$, O (oxirane) | Liquid, chromatographed on SiO$_2$, C$_{32}$H$_{56}$O$_2$ [472.76] Calculated: C 81.29%, H 11.94%, Found: C 81.22%, H 11.78% |
| 6. | t-C$_4$H$_9$–C$_6$H$_2$(OH)(t-C$_4$H$_9$)–CH$_2$–CH–CH–CH$_2$Cl, O (oxirane) | M.p. 87–88° |

Table 1-continued

| Example No. | Formula | M.p./B.p. (° C) |
|---|---|---|
| 7. | 3,5-di-t-C$_4$H$_9$-4-HO-C$_6$H$_2$-CH$_2$-CH(-O-)CH-C$_6$H$_5$ (epoxide) | M.p. 96–97.5° |
| 8. | 3,5-di-t-C$_4$H$_9$-4-HO-C$_6$H$_2$-CH$_2$-CH(-O-)CH-CH$_2$-(3-t-C$_4$H$_9$-4-HO-5-t-C$_4$H$_9$-cyclohexyl) | M.p. 123–24° |
| 9. | 3,5-di-CH$_3$-4-HO-C$_6$H$_2$-CH$_2$-CH(-O-)CH$_2$ | B.p.$_{12}$: 172–75° |
| 10. | 3,5-di-i-C$_3$H$_7$-4-HO-C$_6$H$_2$-CH$_2$-CH(-O-)CH$_2$ | M.p. 52–52.5° |
| 11. | 3-t-C$_4$H$_9$-5-CH$_3$-4-HO-C$_6$H$_2$-CH$_2$-CH(-O-)CH$_2$ | B.p.$_{.3}$: 140–41° |

Table 2

| Starting substance for Example No. | Formula | M.p./B.p. (° C) |
|---|---|---|
| 2. | 3,5-di-t-C$_4$H$_9$-4-HO-C$_6$H$_2$-CH$_2$-C(CH$_3$)=CH$_2$ | B.p.$_{16}$: 162–63° |
| 3. | 3,5-di-t-C$_4$H$_9$-4-HO-C$_6$H$_2$-CH$_2$-CH=CH-CH$_3$ | B.p.$_{16}$: 167–68° |
| 4. | 3,5-di-t-C$_4$H$_9$-4-HO-C$_6$H$_2$-CH$_2$-CH=CH(CH$_2$)$_4$CH$_3$ | B.p.$_{0.16}$: 133–35° |
| 5. | 3,5-di-t-C$_4$H$_9$-4-HO-C$_6$H$_2$-CH$_2$-CH=CH.(CH$_2$)$_{14}$CH$_3$ | M.p. 38–39.5° |
| 6. | 3,5-di-t-C$_4$H$_9$-4-HO-C$_6$H$_2$-CH$_2$-CH=CH-CH$_2$Cl | M.p. 60–61.5° |

Table 2-continued

| Starting substance for Example No. | Formula | M.p./B.p. (° C) |
|---|---|---|
| 7. | 3,5-di-t-C$_4$H$_9$-4-HO-C$_6$H$_2$-CH$_2$-CH=CH-C$_6$H$_5$ | B.p.$_{0.1}$: 152–53° |
| 8. | 3,5-di-t-C$_4$H$_9$-4-HO-C$_6$H$_2$-CH$_2$-CH=CH-CH$_2$-C$_6$H$_2$-3,5-di-t-C$_4$H$_9$-4-OH | M.p. 144–45° |
| 9. | 3,5-di-CH$_3$-4-HO-C$_6$H$_2$-CH$_2$-CH=CH$_2$ | B.p.$_{16}$ 138–41° |
| 10. | 3,5-di-i-C$_3$H$_7$-4-HO-C$_6$H$_2$-CH$_2$-CH=CH$_2$ | B.p.$_{12}$: 140–45° |
| 11. | 3-t-C$_4$H$_9$-5-CH$_3$-4-HO-C$_6$H$_2$-CH$_2$-CH=CH$_2$ | B.p.$_{16}$: 150–51° |

EXAMPLE 12

Manufacture of 3,5-di-tert.-butyl-4-hydroxybenzyl-thiirane.

A solution of 26.2 g [0.10 mol] of 3,5-di-tert.-butyl-4-hydroxybenzyl-oxirane [Example 1] and 8.4 g [0.11 mol] of thiourea in 100 ml of methanol is stirred for 12 hours at room temperature and subsequently poured into water. Extraction of the aqueous phase with chloroform, drying over sodium sulphate and evaporation of the solvent yields crude 3,5-di-tert.-butyl-4-hydroxybenzyl-thiirane, which after recrystallization from petroleum ether melts at 62°–63° C.

EXAMPLE 13

645 g [3.2 mols] of 2,6-di-tert.-butylphenol are fused under nitrogen and 23 g [1 g-atom] of sodium metal in the form of small pieces are added at 60° C. The mixture is warmed to 140° C for 6 hours, whilst stirring, until the entire sodium metal has been converted to the phenolate. 82.5 g [1.1 mol] of 3-chloro-1,2-epoxypropane are added dropwise at 120° C. After 1 hour the light yellow suspension is filtered and the filtrate is fractionally distilled in vacuo. The fraction which passes over at 115°–124° C/0.6 mm is collected. On standing, 3,5-di-tert.-butyl-4-hydroxybenzyl-oxirane crystallizes therefrom; it melts at 84° C after recrystallization from hexane.

EXAMPLE 14

The additives listed in Table 3 are sprinkled dry, at a concentration of 0.5%, onto dried polyamide 6 granules (relative viscosity = 2.9, 1% strength in concentrated sulphuric acid) and the sprinkle-coated mixture is regranulated on a single-screw extruder at 260° C. 0.3 mm thick pressed films are then manufactured from the granules, again at 260° C, and 1 cm broad test strips are punched from these pressed films.

The activity of the additives added to the test specimens is tested by heat aging in a circulating air oven at 165° C. The thermo-oxidative degradation of the material during heat aging is followed by periodically measuring the relative viscosity of a 1% strength solution in 96% strength sulphuric acid, the time after which the relative viscosity has fallen from 2.9 to a value of 2.0 being determined.

Table 3

| Stabilizer Example No. | Heat aging time at 165° C for a decrease in the solution viscosity $\eta_{rel}$ from 2.9 to 2.0, in hours |
|---|---|
| None | 9 |
| 1 | 70 |
| 8 | 68 |

EXAMPLE 15

100 parts of polypropylene (melt index 3.2 g/10 minutes, 230° C/2,160 g) are thoroughly mixed for 10 minutes in a shaking apparatus with 0.2 part of one of the additives listed in Table 4 below. The resulting mixture is kneaded for 10 minutes in a Brabender plastograph at 200° C and the mass thus obtained is subsequently pressed in a platen press at 260° C platen temperature to give 1 mm thick sheets, from which strips 1 cm wide and 17 cm long are punched.

The activity of the additives added to the test strips is tested by heat aging in a circulating air oven at 135° C and 149° C, using an additive-free test strip for comparison. 3 test strips of each formulation are employed. The incipient easily visible decomposition of the test strip is defined as the end point.

Table 4

| Stabilizer, | Days to incipient decomposition | |
| Example No. | 149° C | 135° C |
| --- | --- | --- |
| None | 1 | 5 |
| 1 | 9 | 63 |
| 8 | 16 | 76 |
| 12 | 23 | 70 |

EXAMPLE 16

100 parts of polypropylene (melt index 3.2 g/10 minutes, 230° C/2,160 g) are thoroughly mixed for 10 minutes in a shaking apparatus with 0.1 part of one of the additives listed in Table 5 below and 0.3 part of dilauryl thiodipropionate.

The resulting mixture is kneaded for 10 minutes in a Brabender plastograph at 200° C and the mass thus obtained is subsequently pressed in a platen press at 260° C platen temperature to give 1 mm thick sheets from which strips 1 cm wide and 17 cm long are punched.

The activity of the additives added to the test strips is tested by heat aging in a circulating air oven at 135° C and 149° C, a test strip, which only contains 0.3 part of dilauryl thiodiopropionate, serving for comparison. Three test strips of each formulation are employed. The end point is defined as the incipient, easily visible decomposition of the test strip.

Table 5

| Stabilizer, | Days to incipient decomposition | |
| Example No. | 149° C | 135° C |
| --- | --- | --- |
| None | 5 | 11 |
| 1 | 26 | 107 |
| 4 | 30 | 110 |
| 5 | 33 | 105 |

EXAMPLE 17

The test specimens described in Example 6 were additionally tested for their color stability, in particular:

a. after incorporation (Table 6, column 2)
b. after 500 hours exposure in a Xenotest instrument of Messrs. Hanau (Table 6, column 3)
c. after 1 week's treatment with boiling water (Table 6, column 4)

For Table 6, an empirical colour scale was used in which 5 denotes no colour, 4 denotes a just perceptible, slight discolouration and 3, 2, 1 and <1 denote progressively stronger discoloration.

Table 6

| Stabilizer | Colour assessment according to scale 1–5 | | |
| Example No. | After incorporation | After exposure | Boiling water, 1 week |
| --- | --- | --- | --- |
| 1 | 4 | 4–5 | 4–5 |
| 2 | 4 | 4 | 4 |

Table 6-continued

| Stabilizer | Colour assessment according to scale 1–5 | | |
| Example No. | After incorporation | After exposure | Boiling water, 1 week |
| --- | --- | --- | --- |
| 10 | 4 | 4 | 4 |

EXAMPLE 18

100 parts of polyvinyl chloride manufactured by the suspension process (Solvic 229) are mixed for 5 minutes on a laboratory mill at 170° with 20 parts of dioctyl phthalate, 0.60 part of cadmium laurate, 0.90 part of barium laurate and 0.50 part of the co-stabilizer of Table 7. To test the activity of the additive introduced into the polymer, sheets produced in this way are subjected to a heat test in an oven at 170° C. The complete discolouration of the test sheets is defined as the end point. Table 7 shows the comparison of a stabilized and unstabilized sheet.

Table 7

| Co-stabilizer, Example No. | Minutes up to complete discolouration |
| --- | --- |
| None | 60 |
| 1 | 120 |

EXAMPLE 19

0.25 part of the additives of Table 8 is in each case dissolved in 100 parts of a cold 25% strength polyurethane solution (ESTANE 5707 of Messrs. Goodrich). Approx. 400μ thick films are spread from these solutions on a glass plate, using a film-spreader, and after approx. 10 minutes' circulating air drying at 140° C, these films dry out to give films of a final thickness of 100μ. Accordingly, the stabilizers are present in the films in a concentration of 1.0%. Samples of these films are exposed in a Xenotest instrument, on a white cardboard background, until incipient visually perceptible yellowing is noted.

Table 8

| Stabilizer, Example No. | Exposure time in the Xenotest instrument up to distinctly visible yellowing (in hours) | Notes |
| --- | --- | --- |
| None | 100 | — |
| 1 | 250 | compatible |

EXAMPLE 20

100 parts of polypropylene (melt index 159/10 minutes; 230° C/2,160 g) are thoroughly mixed for 10 minutes in a shaking apparatus with 0.1 part of one of the additives listed in Table 9 and 0.3 part of dilauryl thiodipropionate.

The resulting mixture is extruded in a laboratory single-screw extruder (Plamvo) at 260° C nozzle temperature, 100 revolutions/minute with a throughput of 50 g/minute, and is subsequently granulated.

The resulting granules are spun in a spinning apparatus at a nozzle temperature of 290° C to give polyfilaments which are subsequently further stretched in the ratio of 1:4.

The resulting filaments are subjected to a "gas-fading test" for 1 hour, that is to say exposed at 60° C, in an ASTM standard apparatus (AATCC Type 8727) to the combustion gases of fuels usually employed for heating purposes. The visual color assessment of the fibre samples gas-treated in this way can be seen from Table 9.

Table 9

| Stabilizer, Example No. | Visual colour assessment |
|---|---|
| None | colourless |
| Octadecyl-3-(3,5-di-tert.-butyl-4-hydroxyphenyl)-propionate | reddish |
| 1 | colourless |

It can thus be seen clearly that the discoloration of the material caused by octadecyl-3-(3,5-di-tert.-butyl-4-hydroxyphenyl)-propionate does not occur in the case of the tested compound according to the invention.

What we claim is:

1. Compounds of the formula I

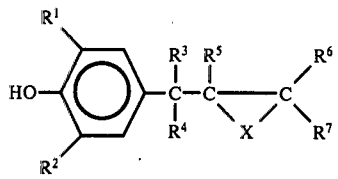

in which $R^1$ is alkyl with 1 to 8 carbon atoms, $R^2$ is alkyl with 1 to 8 carbon atoms, $R^3$, $R^4$, and $R^6$ independently of one another are hydrogen, $R^5$ is hydrogen or methyl, $R^7$ is hydrogen, alkyl with 1 to 17 carbon atoms, halogenomethyl, phenyl or a

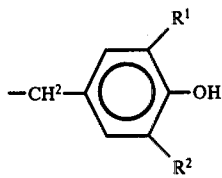

radical and X is O or S.

2. Compounds according to claim 1, wherein $R^1$ and $R^2$ independently of one another are alkyl with 1 to 4 carbon atoms, $R^3$, $R^4$ and $R^6$ are hydrogen, $R^5$ is hydrogen, or methyl $R^7$ is hydrogen, alkyl with 1 to 15 carbon atoms, —$CH_2Cl$, —$CH_2Br$ or a

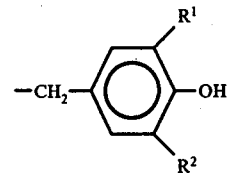

radical and X is O or S.

3. Compounds according to claim 1, wherein $R^1$ and $R^2$ are tert.-butyl, $R^3$, $R^4$ and $R^6$ are hydrogen, $R^5$ is hydrogen or methyl, $R^7$ is hydrogen, alkyl with 1 to 15 carbon atoms or the

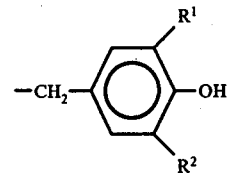

radical and X is O or S.

4. 3,5-Di-tert.-butyl-4-hydroxybenzyl-oxirane, according to claim 1.

5. 2-Methyl-2-(3,5-di-tert.-butyl-4-hydroxybenzyl)-oxirane, according to claim 1.

6. 2-(3,5-Di-tert.-butyl-4-hydroxybenzyl)-3-chloromethyl-oxirane, according to claim 1.

7. 2-(3,5-Di-tert.-butyl-4-hydroxybenzyl)-3-pentadecyl-oxirane, according to claim 1.

* * * * *